(12) United States Patent
MacDonald et al.

(10) Patent No.: US 9,464,434 B2
(45) Date of Patent: Oct. 11, 2016

(54) TWISTED BLOCK

(71) Applicant: Keystone Retaining Wall Systems LLC, Minneapolis, MN (US)

(72) Inventors: Robert A. MacDonald, Plymouth, MN (US); Thomas S. Riccobene, Albuquerque, NM (US)

(73) Assignee: Keystone Retaining Wall Systems LLC, Minneapolis, MN (US)

( * ) Notice: Subject to any disclaimer, the term of this patent is extended or adjusted under 35 U.S.C. 154(b) by 0 days.

(21) Appl. No.: 14/205,760

(22) Filed: Mar. 12, 2014

(65) Prior Publication Data

US 2014/0272449 A1    Sep. 18, 2014

Related U.S. Application Data

(60) Provisional application No. 61/790,268, filed on Mar. 15, 2013.

(51) Int. Cl.
| | | |
|---|---|---|
| *E04C 5/04* | (2006.01) | |
| *E04C 1/00* | (2006.01) | |
| *A01G 1/08* | (2006.01) | |
| *A01G 1/00* | (2006.01) | |
| *E01C 5/04* | (2006.01) | |
| *E01C 5/06* | (2006.01) | |
| *E01C 5/16* | (2006.01) | |
| *E04B 2/12* | (2006.01) | |
| *E04C 1/39* | (2006.01) | |

(52) U.S. Cl.
CPC ............... *E04C 1/00* (2013.01); *A01G 1/007* (2013.01); *A01G 1/08* (2013.01); *E01C 5/04* (2013.01); *E01C 5/06* (2013.01); *E01C 5/16* (2013.01); *E04B 2/12* (2013.01); *E04C 1/395* (2013.01); *Y10T 428/12389* (2015.01); *Y10T 428/24355* (2015.01); *Y10T 428/24479* (2015.01); *Y10T 428/24488* (2015.01)

(58) Field of Classification Search
CPC .............. E04C 1/00; E01C 5/00; E01C 5/04; E01C 5/06
USPC .......... 52/603, 604, 608, 609, 596, 569, 570, 52/102; D25/113, 118; 404/42, 39
See application file for complete search history.

(56) References Cited

U.S. PATENT DOCUMENTS

| | | |
|---|---|---|
| 2,605,681 A | 8/1952 | Trief |
| 4,354,773 A | 10/1982 | Noack |
| 4,596,513 A | 6/1986 | Stratton |
| D433,157 S * | 10/2000 | Whitson ................. D25/113 |
| RE37,694 E | 5/2002 | Riccobene |

(Continued)

OTHER PUBLICATIONS

Gerhold Freeremann, Tempora Brochure, Apr. 14, 1998, pp. 1-13.

*Primary Examiner* — William Gilbert
(74) *Attorney, Agent, or Firm* — Greer, Burns & Crain, Ltd.

(57) ABSTRACT

A block suitable for use in paving, edging or wall applications comprises a lower portion having parallel, substantially vertical side faces that are spaced apart by a first width, and an upper portion having parallel, substantially vertical side faces that are spaced apart by a second width. The second width is smaller than the first width of the lower portion, and the side faces of the upper portion are angled relative to the side faces of the lower portion. The block further comprises a transition portion between the upper and lower portions, having at least one slanted side extending between one or more sides of the lower portion and one or more sides, respectively, of the upper portion.

22 Claims, 18 Drawing Sheets

(56) References Cited

U.S. PATENT DOCUMENTS

| | | |
|---|---|---|
| D471,990 S | 3/2003 | Riccobene |
| 6,688,810 B2 | 2/2004 | Jansson |
| D506,013 S * | 6/2005 | Anderson et al. ........... D25/113 |
| 7,393,155 B2 | 7/2008 | Riccobene |
| 7,637,688 B2 | 12/2009 | Riccobene |
| 7,712,281 B2 * | 5/2010 | Bott ................................ 52/604 |
| D653,356 S * | 1/2012 | MacDonald ................ D25/113 |
| D674,510 S | 1/2013 | Riccobene |

* cited by examiner

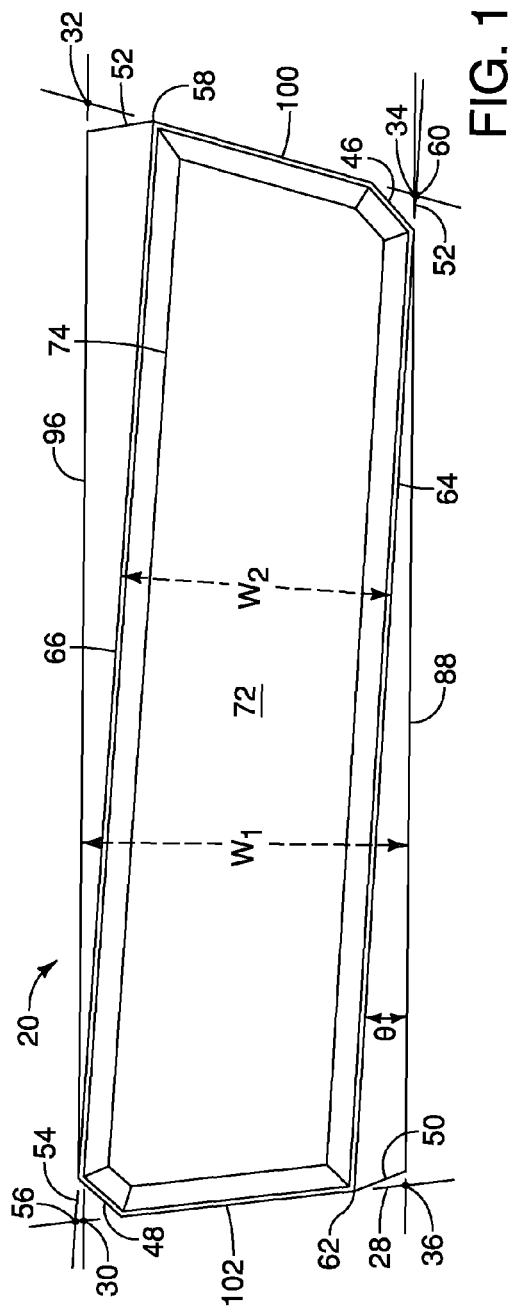
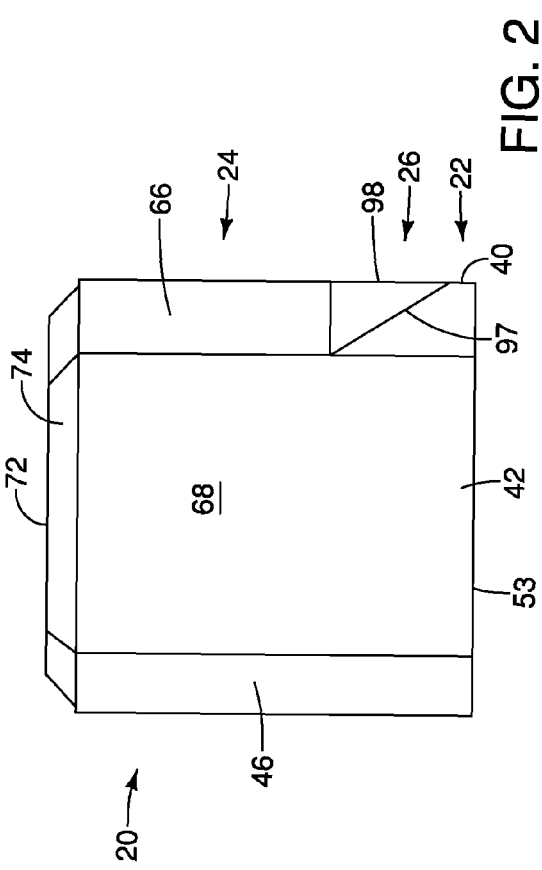

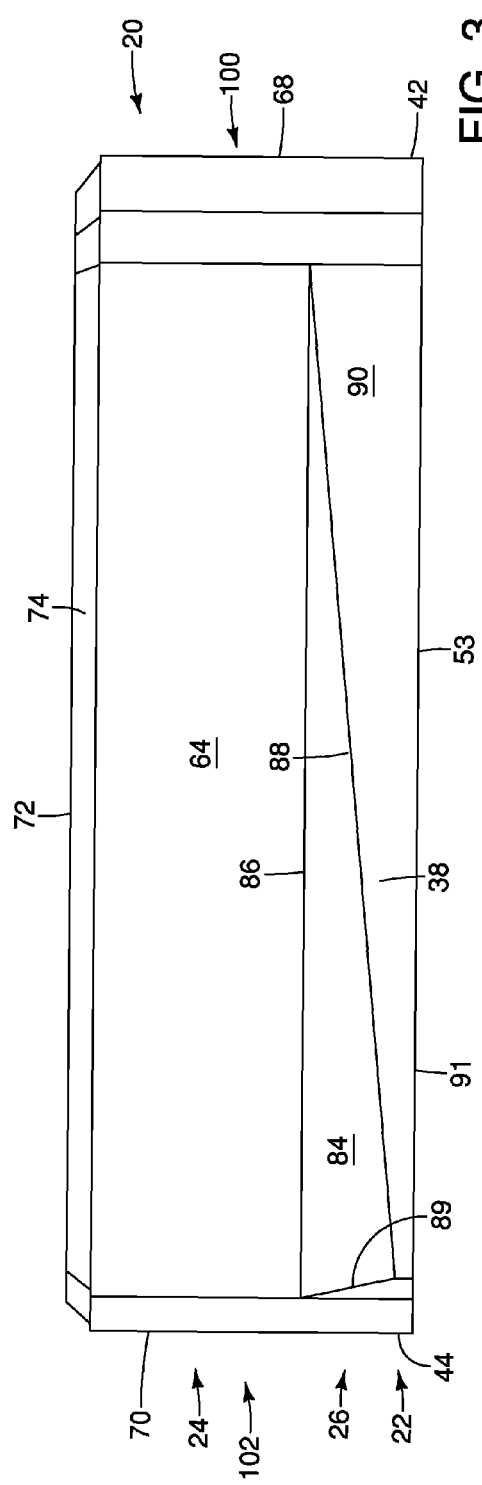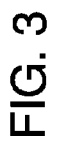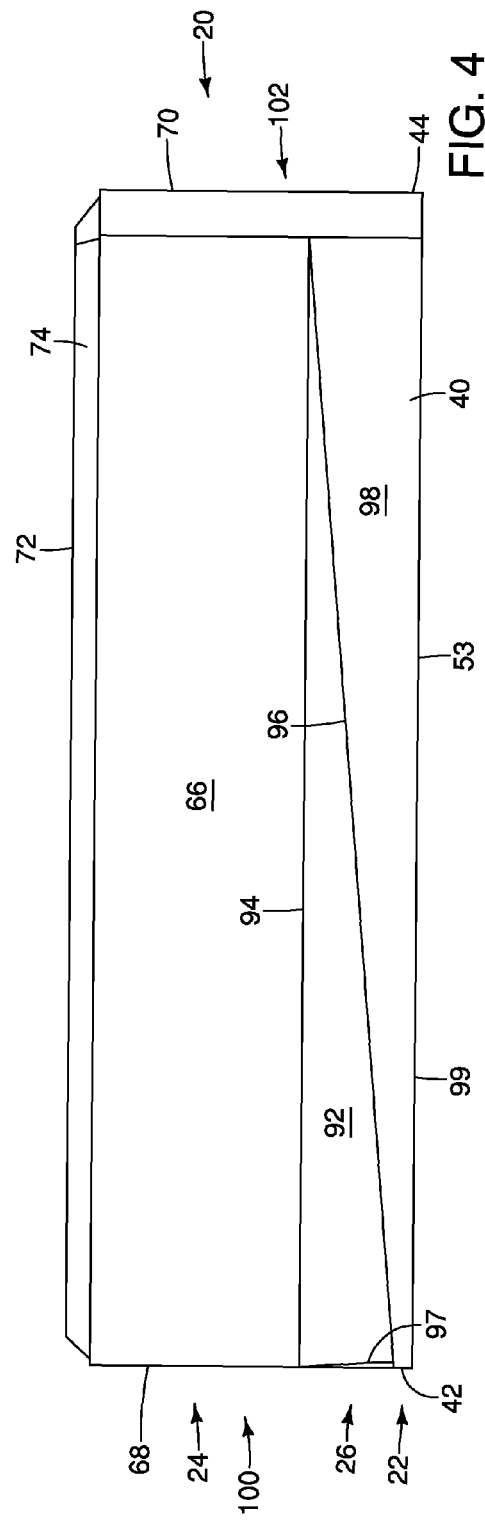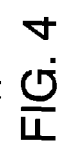

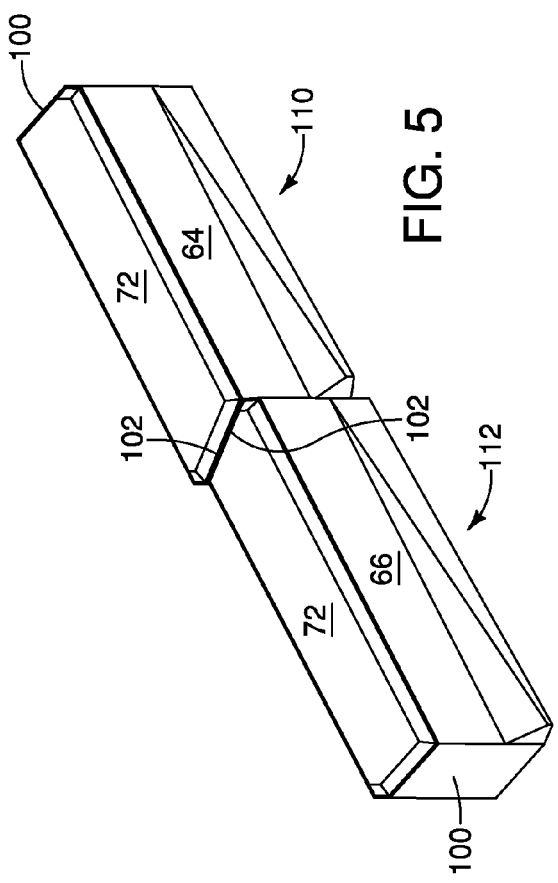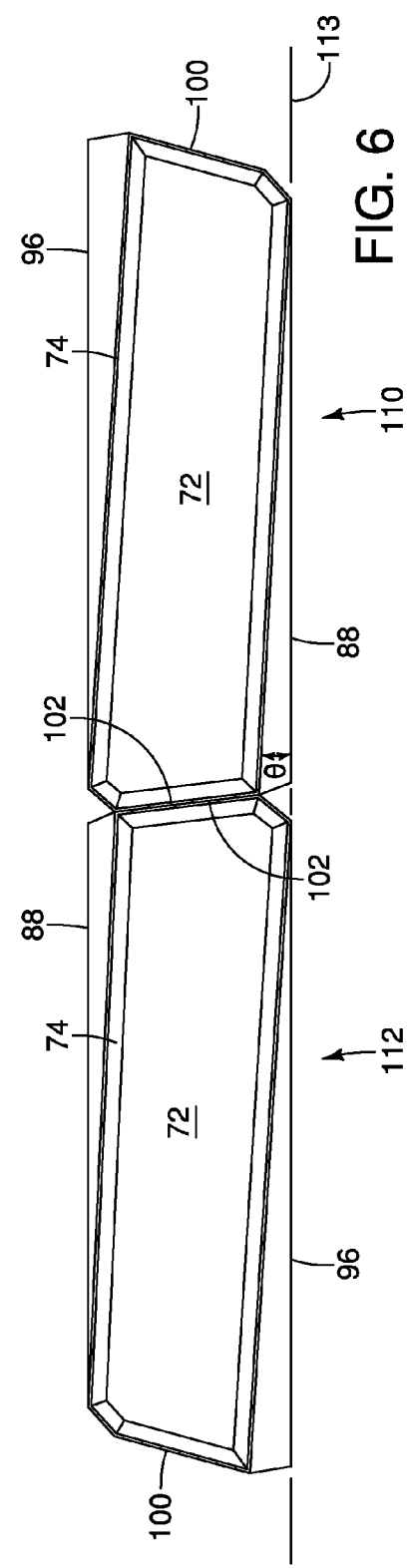

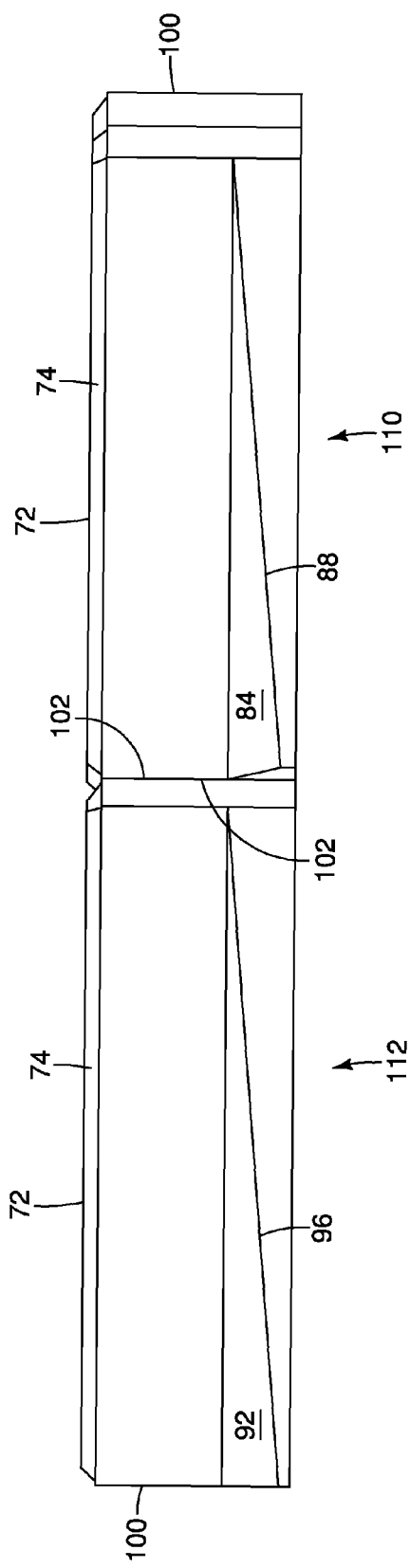

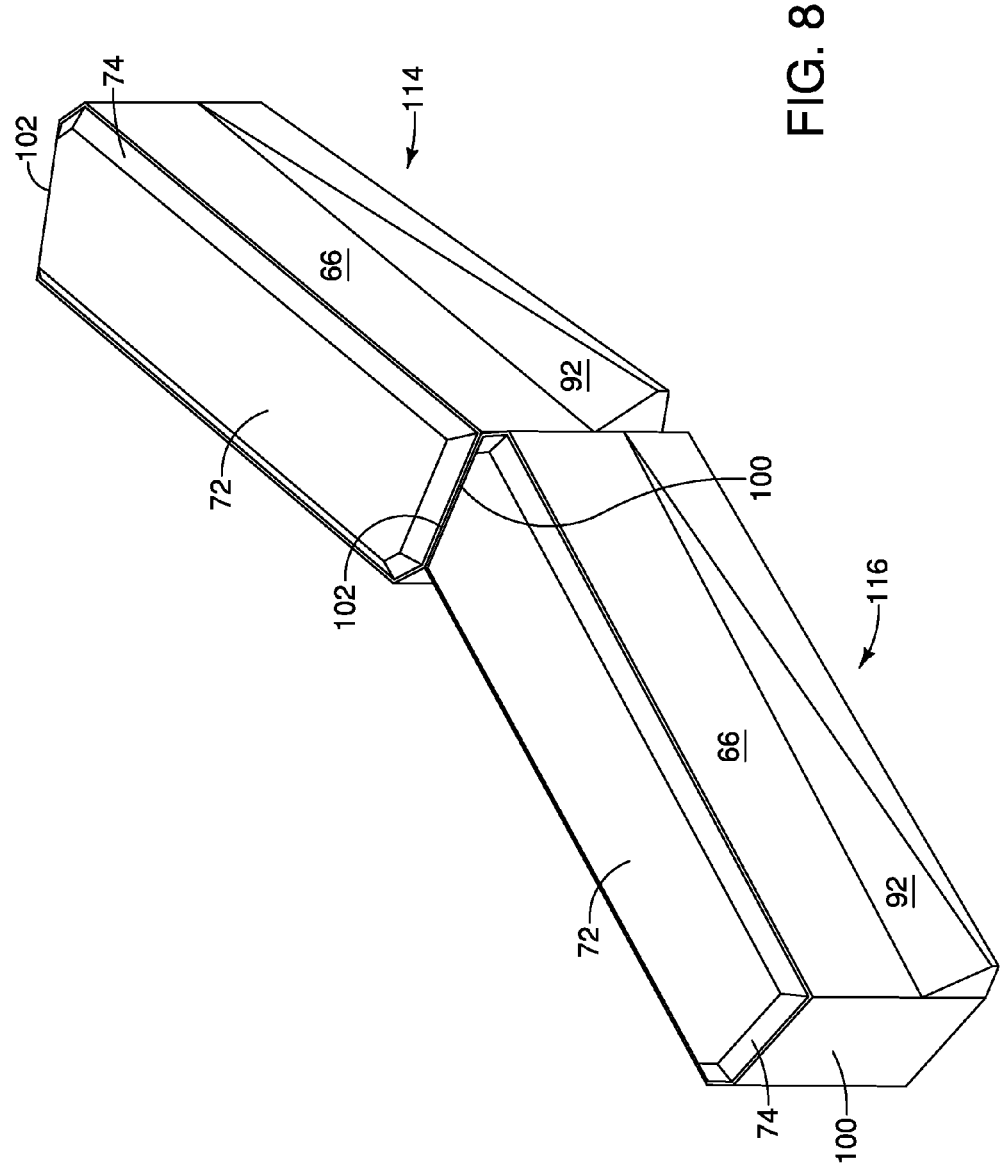

TWISTED BLOCK

PRIORITY CLAIM

This application claims priority of U.S. Provisional Application Ser. No. 61/790,268, filed Mar. 15, 2013, under 35 U.S.C. §119.

FIELD OF THE INVENTION

A field of the invention is landscape edgers for garden borders and other landscape settings. Another field of the invention is repeating elements forming a surface covering, and more specifically relates to stones, bricks, and pavers for forming surface coverings or other structures.

BACKGROUND

Edgers are known in the art for edging flowerbeds, forming lawn borders, ringing trees and the like. Edgers can include stones or bricks of various configurations, including simple or more complex geometric shapes. Manufactured units typically are laid end to end to form a line, which can be straight, curved, serpentine, or combinations thereof. Edgers can also be used to form circular rings, ovals and other closed patterns. Example edgers are shown in U.S. design Pat. Nos. RE37,694 and D471,990, both by Thomas Riccobene.

Additionally, it is well known to cover surfaces, such as walkways, driveways, patios, floors, work surfaces, walls and other interior or exterior surfaces with stones, bricks, pavers, tiles and other architectural surface covering units. It is further known to construct walls and other structures with stone and bricks. Conventional surface coverings and structures are also constructed of manufactured pavers, bricks, tiles or other units. Manufactured units are typically provided in geometric shapes, such as squares, rectangles and hexagons, or combinations thereof. Surfaces covered with manufactured units typically are laid in repeating patterns. Alternatively, it is known to lay conventional units in random, non-repeating patterns. Some blocks can be used as either a paver or and edger, as shown for example in U.S. Pat. No. 7,637,688 to Thomas Riccobene.

Prior art landscape retaining systems and surface coverings have met with varying degrees of success and failure. As always, there is considerable room for improvement.

SUMMARY

Embodiments of the invention provide, among other things, a twisted block suitable for use in paving, edging or wall applications. The block has a lower portion having parallel, substantially vertical side faces that are spaced apart by a first width. An upper portion of the block has parallel, substantially vertical side faces that are spaced apart by a second width. The second width is smaller than the first width of the lower portion. The upper portion is rotated or twisted relative to the lower portion such that the side faces of the upper portion are angled relative to the side faces of the lower portion. A transition portion between the upper and lower portions has slanted sides extending between one or more sides of the lower portion and one or more sides, respectively, of the upper portion.

In a non-limiting example embodiment, the lower portion generally defines a first trapezoid in plan view, and the upper portion generally defines a second trapezoid in plan view. In other example embodiments, the lower portion and upper portion each define squares, rectangles, or other quadrilaterals. Transition portions having slanted sides can be disposed on one or both sides, one or both ends, or any combination of sides and ends. The transition portion can be located at a lower location closer to a bottom surface of the block, or can be located at a higher location. Optional gaps can be provided in the transition portion and the lower portion on one or more sides or ends. Such units can be used to construct a pervious surface covering.

A system for edging comprises a plurality of blocks (e.g., two or more, with no upper limit) including at least first and second adjacent blocks. The blocks are abutted end to end in a straight line. The upper portions of the blocks are uniformly slanted relative to the line and are offset relative to each other to form an interesting "saw tooth" or stepped configuration. Another system for edging comprises a plurality of blocks (e.g., two or more, with no upper limit) including at least first and second adjacent blocks. The blocks are abutted end to end so that the blocks are disposed at an oblique angle to one another to thereby form a curved edge.

An example surface comprises at least two adjacent bonded rows, each row including at least first and second adjacent blocks. Within each row, the first and second blocks are abutted end to end to form a line. The first and second blocks are uniformly slanted relative to the line and are offset relative to one another. The slants of the first and second blocks in one of the two rows can be substantially parallel. Alternatively, the first and second blocks in one row can be reversed in orientation relative to the first and second blocks in an adjacent row. Other patterns for arrangement of the blocks include, but are not limited to, herringbone, running bond, half bond, basket weave, "I" formations, etc. Surfaces can include combinations of different blocks, including blocks defining respectively different quadrilateral shapes. Such blocks can be disposed along the surface, as an edger, or both. In a particular example embodiment, blocks defining one quadrilateral shape, such as a square, provide a paving surface, while blocks defining another quadrilateral shape, such as a trapezoid or rectangle, border the square blocks and provide an edge.

Various embodiments of the invention are described below by way of example only, with reference to the accompanying drawings. The drawings include schematic figures that may not be to scale, which will be fully understood by skilled artisans with reference to the accompanying description. Features may be exaggerated for purposes of illustration. From the preferred embodiments, artisans will recognize additional features and broader aspects of the invention.

BRIEF DESCRIPTION OF THE DRAWINGS

FIG. 1 is a top plan view of a twisted block suitable for paving, edging, or for wall applications, according to an embodiment of the invention.

FIG. 2 is an end view of the block of FIG. 1. The opposing end view of the block is similar to FIG. 2.

FIG. 3 is an elevational view of one side of the block of FIG. 1.

FIG. 4 is an elevational view of the other side of the block of FIG. 1.

FIG. 5 is a perspective view of two adjacent blocks according to FIG. 1, with a second end of one block flush with a second end of a second block.

FIG. 6 is a top plan view of the two adjacent blocks of FIG. 5.

FIG. 7 is a front elevation view of the two adjacent blocks of FIG. 5.

FIG. 8 is a perspective view of two adjacent blocks according to FIG. 1, with a first end of one block abutting a second end of a second block.

DETAILED DESCRIPTION

Figure 9:
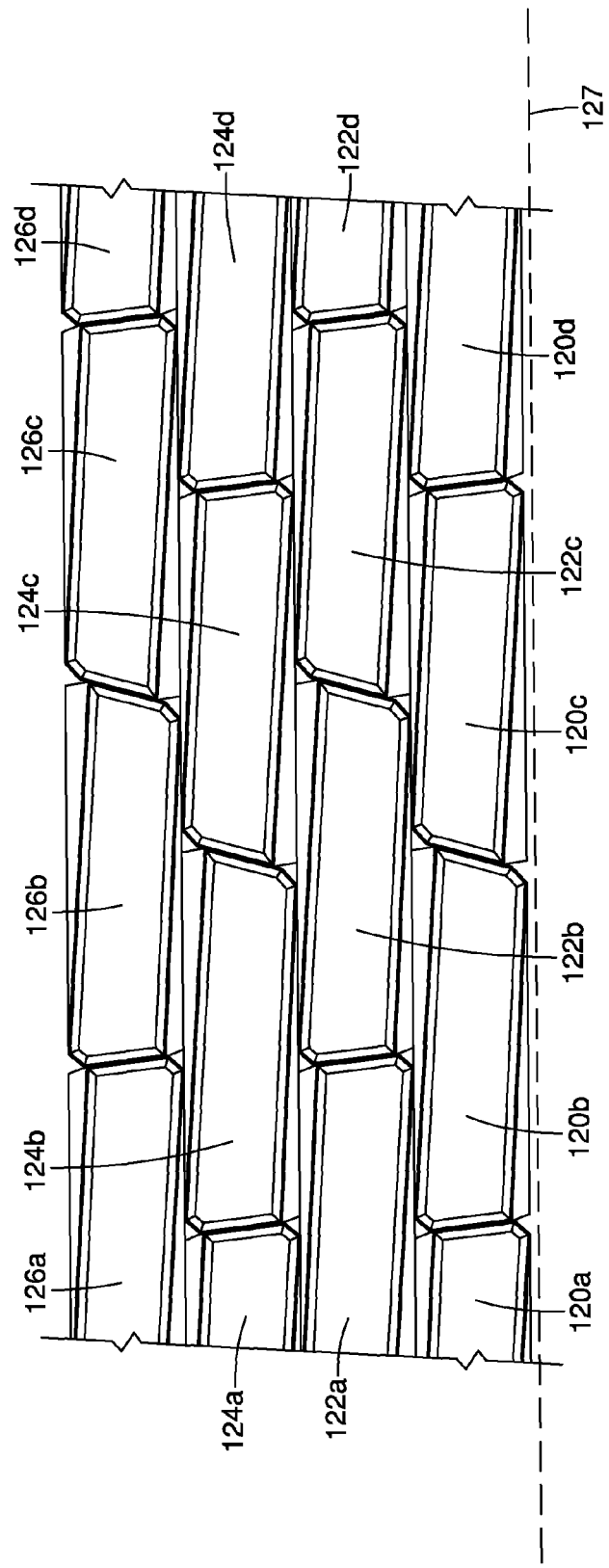
FIG. 9 is a top plan view of a surface covering having rows of adjacent blocks in which the upper portion of the blocks in adjacent rows are slanted substantially parallel to one another.

FIGS. 1-4 show a block 20 according to an embodiment of the invention. The block 20 is suitable for use in paving, edging, or for wall applications. Preferably, but not necessarily, the block 20 is unitary; that is, the block is preferably made in one piece from the same material, though it is also contemplated that the blocks may be made from a combination of materials. Materials can be selected for particular applications. Example materials for the block 20 include concrete, stone (e.g., masonry stone), plastic, and metal. A non-limiting example block length is twelve inches.

As best viewed in FIGS. 2-4, the outer surface of the block 20 includes a lower portion 22, which is disposed at the bottom of the block. As used herein, "lower," "upper," "top," "bottom," and "vertical" will be used with respect to the top-to-bottom orientation shown in FIGS. 2-4. The block outer surface also includes an upper portion 24 that is disposed above the lower portion 22. A transition portion 26 of the outer surface of the block 20 is disposed vertically between the lower portion 22 and the upper portion 24. The transition portion generally refers to the portion of the outer surface of the block 20 that transitions from the configuration of the lower portion 22 to the configuration of the upper portion 24 (or vice versa). The lower portion 22 and the transition portion 26 in combination can also be considered a foot for the block 20. It will be appreciated that though these portions 22, 24, 26 are described separately for purposes of clarity, the block surfaces defining these portions can have discrete or continuous transitions. Also, the height of each portion may vary across the length and/or width of the unit.

As best viewed in FIG. 1, in a non-limiting example embodiment, the lower portion 22 generally defines, in plan view or horizontal cross-section, a first trapezoid 28 that theoretically is between points 30, 32, 34, and 36. The first trapezoid 28 can be, for instance, an isosceles trapezoid. The first trapezoid 28 is more particularly defined by a substantially vertical first lower side face 38 (best viewed in FIG. 3) that defines a first base, a substantially vertical second lower side face 40 (best viewed in FIG. 4) that defines a second base, a lower first end face 42 (best viewed in FIG. 2) that defines a first leg, and a lower second end face 44 (not directly shown, but similar to face 42 in FIG. 2) that defines a second leg. As shown in FIG. 1, the first lower side face 38 and the second lower side face 40 are spaced apart by a first width W1. In this example block 20 the "lower portion" generally refers to the portion of the block which in plan view defines the first trapezoid 28. This lower portion 22 can be of essentially any height. It is also contemplated that the plan view of the lower portion 22 can be a different shape; e.g. a differently shaped quadrilateral, examples of which are provided herein, though other shapes will be apparent to those of ordinary skill in the art.

In an example embodiment, and as best viewed in FIG. 1, the block 20 has optional beveled edges 46, 48, 50, 52. The block 20 includes a bottom surface 53, which may be part of the lower portion 22, or may be disposed underneath the lower portion 22. The bottom surface 53 of the block 20 preferably, but not necessarily, has edges matching the first trapezoid 28. This bottom surface 53 may be, for example, a smooth planar surface, a textured surface, or a different configuration.

The upper portion 24 can (but need not in all embodiments) generally define, in plan view or horizontal cross-section, a second trapezoid 54 (FIG. 1) that theoretically is between points 56, 58, 60, and 62. The second trapezoid 54 has a length that preferably is substantially the same as the first trapezoid 28, but has a smaller width W2. Opposing corners of the second trapezoid, at points 56 and 60, substantially coincide with respective opposing corners of the first trapezoid, at points 30 and 34. However, opposing corners of the second trapezoid 54, at points 58 and 62, are inwardly spaced from the corresponding opposing corners of the first trapezoid, at points 32 and 36. Accordingly, as best shown in FIG. 1, the second trapezoid 54 is rotated or twisted relative to the first trapezoid 28, as explained further herein below. Blocks in which the shape defined by the upper portion 24 appears rotated or twisted with respect to the shape defined by the lower portion 22 are referred to as twisted blocks herein.

The second trapezoid 54 is more particularly defined by a substantially vertical first upper side face 64 (best viewed in FIG. 3) that defines a first base of the trapezoid, a substantially vertical second upper side face 66 (best viewed in FIG. 4) that defines a second base of the trapezoid, an upper first end face 68 (best viewed in FIG. 2) that defines a first leg, and an upper second end face 70 (not shown in FIG. 2, but similar to upper first end face 68) that defines a second leg. Thus, the distance between the first upper side face 64 and the second side face 66 defines the width W2.

The block 20 also includes a top surface 72 (best viewed in FIG. 1), which may be part of the upper portion 24, or may be disposed above the upper portion. The top surface 24 preferably, but not necessarily, has edges defining a trapezoid similar or identical to the second trapezoid 54, as shown in FIG. 1. In the example block 20, the top surface 72 optionally includes a beveled edge 74, best viewed in FIG. 1, which generally follows the shape of the second trapezoid 54. In this example block 20 the "upper portion" generally refers to the portion of the block 20 which in plan view defines the second trapezoid 54. However, in other embodiments the upper portion 24 can have a different shape in plan view, such as a different quadrilateral shape, examples of which are provided herein, and other shapes will be apparent to those of ordinary skill in the art.

Theoretical points 56 and 60 of the second trapezoid 54 extend beyond the surface of the upper portion 24 due to the first and second vertically oriented bevels 46, 48. Theoretical points 58 and 62 of the second trapezoid 54 in the example block 20 are disposed at the intersection of the second upper side face 66 and upper first end face 68 (point 58), and at the intersection of the first upper side face 64 and upper second end face 70 (point 60), respectively.

The transition portion 26 includes a first side transition portion 84 (best viewed in FIG. 3) disposed between the first lower side face 38 and the first upper side face 64, and a second side transition portion 92 (best viewed in FIG. 4) disposed between the second lower side face 40 and the second upper side face 66. The first side transition portion 84 includes a slanted side. This slanted side 84 extends downwardly and outwardly from an inner edge 86 disposed at the first upper side face 64 to an outer edge 88 that is disposed vertically above the outer edge of the first lower face 38. The inner edge 86 and the outer edge 88 intersect at an acute angle both in plan view as shown in FIG. 1 and in side elevational view as shown in FIG. 3. Slanted side 84 is generally triangular shaped being defined by inner edge 86, outer edge 88 and a third edge 89 adjacent the end of the block. The outer edge 88 in turn defines a substantially triangular vertical surface 90 that extends vertically from the outer edge 88 to the bottom edge 91 of the first lower side face 38. Thus, in the example block 20, the outer edge 88 also defines the first base of the first trapezoid 28 in plan view.

Similarly, the second side transition portion 92 (FIG. 4) includes a slanted side that extends from the second upper side face 66. Particularly, the slanted side 92 extends downwardly and outwardly from an inner edge 94 disposed at the second upper side face 66 to an outer edge 96 disposed vertically above the second lower side face 40. The inner edge 94 and the outer edge 96 intersect at an acute angle, preferably the same angle as that of the intersection of the inner edge 86 and the outer edge 88. Slanted side 92 is generally triangular shaped defined by inner edge 94, outer edges 96 and a third edge 97 adjacent the end of the block. A substantially triangular vertical surface 98 extends vertically from the outer edge 96 to a bottom edge 99 of the second lower side face 40. Thus, the outer edge 96 in an example embodiment also defines the second base of the first trapezoid 28 in plan view. The inner edges 86 and 94 of the first side and second side transition portions 84, 92 are spaced by the second width W2 shown in FIG. 1, and the outer edges 88, 96 are spaced by the first width W1.

Referring to FIGS. 1-4, the example block 20 includes a vertically oriented first end 100 and a vertically oriented second end 102. The vertically oriented first end 100 in this embodiment is shared by (i.e., includes) both the upper first end face 68 and the lower first end face 42. In this way, the first leg of the first trapezoid 28 and the first leg of the second trapezoid 54 are in the same plane of the vertically oriented first end 100, as shown in FIG. 1. Similarly, the vertically oriented second end 102 is shared by (i.e., includes) both the upper second end face 70 and the lower second end face 44. Thus, the second leg of the first trapezoid 28 and the second leg of the second trapezoid 54 are both in the same plane of the vertically oriented second end 102.

However, the first upper side face 64 (FIG. 3) and the second upper side face 66 (FIG. 4) are not in the same plane, respectively, as the first lower side face 38 and the second lower side face 40, due to the twisted configuration of the block 20. The first and second upper side faces 64, 66 are rotated in a horizontal plane by an angle θ (FIG. 1) relative to the first and second lower side faces 38, 40. Angle θ, which can be defined by the first and second slanted sides 84, 92, can be as non-limiting examples between 1 degree and 10 degrees, and is preferably between 2 and 5 degrees. This rotation produces an interesting aesthetic in which the upper portion 24 is rotated or twisted with respect to the lower portion 22. In the example block 20, the second trapezoid 54 preferably is substantially contained within and does not substantially extend beyond the area of the first trapezoid 28.

Accordingly, in the first embodiment, the lower portion of the unit is generally trapezoidal in plan view as shown by lines 28 and the upper portion of the unit is also generally trapezoidal in plan view as shown by lines 54, the upper portion being rotated or twisted relative the lower portion. In other embodiments the lower and upper portions may have other shapes in plan view, including but not limited to squares, rectangles, rhombi, hexagons, octagons, triangles, and other shapes, non-limiting examples of which are shown in the drawings. Further, the shape of the upper portion in plan view need not be the same as the lower portion. Further, the parallel sides of the lower and upper portions need not be linear in plan view, but alternatively can include one or more offsets or other deviations along the length of the unit. The offsets can allow for adjoining or abutting units to interlock with each other.

FIGS. 5-7 show an example configuration of two adjacent blocks 110, 112 that have essentially the same design as block 20. Block 112 is flipped relative to block 110, i.e., the blocks are disposed so that that they are oriented in opposite directions with respect to one another in the horizontal plane (horizontally flipped). Thus, the second end 102 of the block 110 abuts the second end 102 of the block 112. Additional blocks can be added forming a straight line, every other block flipped, to provide an edge or border. As can be seen in FIG. 6, the sides of the lower or base portions 22 (i.e., outer edges 88, 96) of the adjacent blocks 110, 112 are abutted end to end along a line 113. The sides of the upper portions 24 of the blocks are not in line, however. Instead, the upper sides (the first upper side face 64 and second upper side face 66 of each block 110, 112) are parallel to each other but offset. Furthermore, the upper portions 24 of the blocks are uniformly slanted or orientated at an angle Θ relative to the aforementioned straight line 113 of the edge or border. This creates an interesting aesthetic, which may be described as a saw tooth or stepped configuration. The slanted appearance of the upper portion 24 of the blocks 110, 112 combined with the alternating orientation of the upper trapezoid 54 shape provides an interesting pattern, even though the blocks 110, 112 (and others in sequence) are in a straight horizontal line.

FIG. 8 shows another orientation of two adjacent blocks 114, 116. Blocks 114, 116 have essentially the same design as block 20. A first end 100 of block 114 abuts a second end 102 of block 116. In this orientation, block 116 is angled (e.g., obliquely angled) relative to block 114. As additional blocks are added according to this arrangement, the resulting edger or border will curve. As is well known in the art, multiple blocks can be assembled in various combinations of same or horizontally flipped orientations to form edges or borders that are straight, curve left, curve right, form rings, curve in serpentine patterns, or combinations thereof.

FIG. 9 shows a surface covering 118 having four adjacent rows 120, 122, 124, 126 each having four adjacent blocks 120a-120d, 122a-122d, 124a-124d, 126a-126d. Each row of blocks is abutted end to end in a line, such as line 127 for the first row 120. Within each row adjacent blocks are uniformly slanted relative to the line, as with the blocks 110, 112 shown in FIG. 6. Further, the slants of the blocks in each row 120, 122, 124, 126 are substantially parallel to slants of the blocks in the other rows. The rows 120, 122, 124, 126 and blocks within each row can be bonded, such as via half-bond (as shown in FIG. 9), quarter-bond, etc., to provide the surface covering 118. The four rows of four adjacent blocks in FIG. 9 are merely for illustration, and greater or fewer numbers of rows and/or blocks in each row can be used. Joints between adjacent blocks in rows or between rows can be, but need not be, filled with loose material, e.g., sand, gravel, sod, or with cemented material, e.g., grout or sand with a polymer resin binder.

Figure 10:
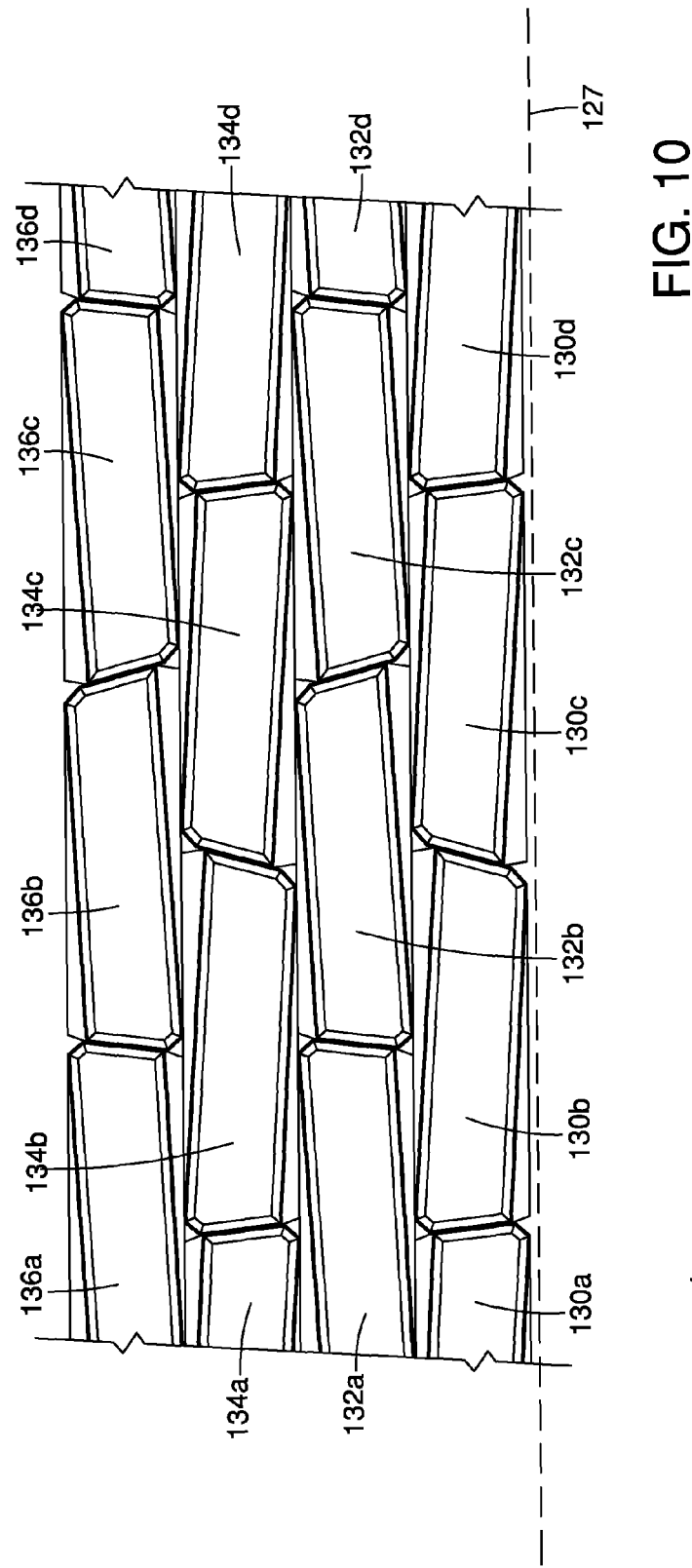
FIG. 10 is a top plan view of a surface covering having rows of adjacent blocks in which the upper portions of the blocks in adjacent rows are slanted obliquely to one another.

FIG. 10 shows an alternative surface covering 128 having four adjacent rows 130, 132, 134, 136 in half-bond each having four adjacent blocks 130a-130d, 132a-132d, 134a-134d, 136a-136d. Each row of blocks is abutted end to end in a line, such as line 127 for row 130, similar to the surface covering 118 in FIG. 9. However, in FIG. 10, alternate rows 132, 136 have blocks that are reversed in orientation from the blocks in rows 130, 134. This causes the slants in blocks in adjacent rows to be oblique to one another. Again, the four rows of four adjacent blocks in FIG. 10 are merely for illustration, and greater or fewer numbers of rows and/or blocks in each row can be used. In an alternative embodiment (not shown), some adjacent rows are oriented similarly to those in FIG. 9, and other adjacent rows are oriented similarly to those in FIG. 10.

Figure 11:
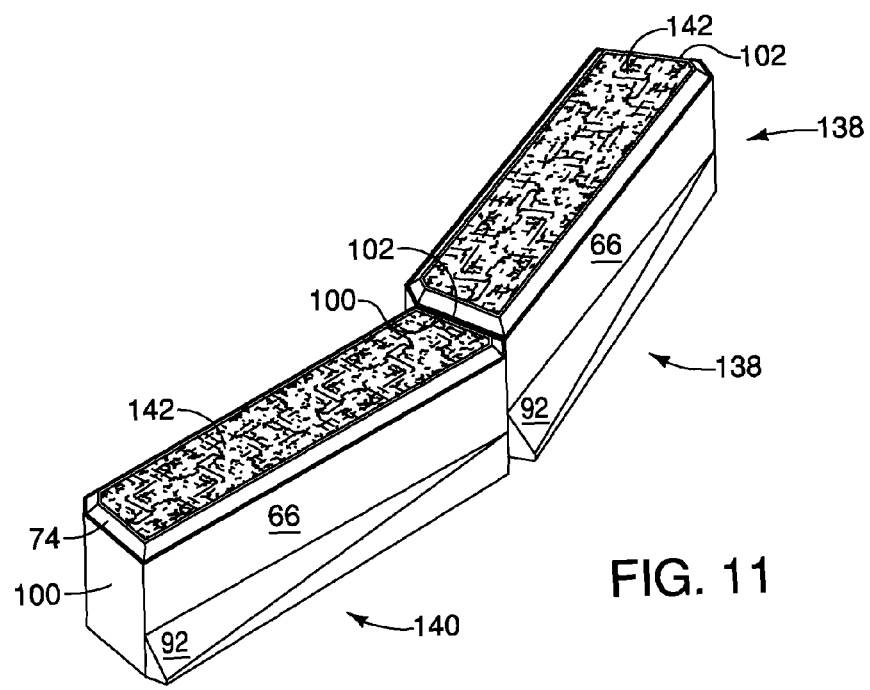
FIG. 11 is a perspective view of two adjacent blocks according to a second embodiment of the invention, with a second end of one block abutting a second end of a second block.
Figure 12:
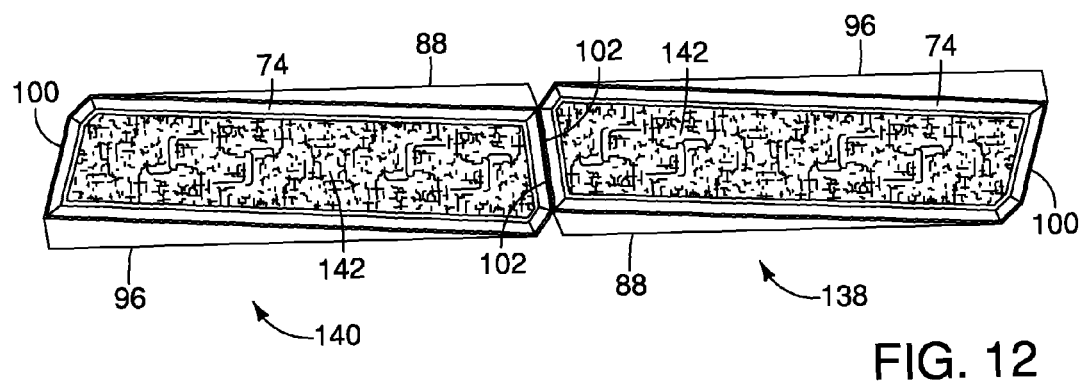
FIG. 12 is a top plan view of two adjacent blocks according to the second embodiment of the invention, with a first end of one block abutting a second end of a second block.

An example top surface 72 is substantially smooth. In some applications, smooth surfaces and/or geometric configurations advantageously provide a modern or contemporary appearance. In other applications, it is desirable to provide a more natural appearance. It is also contemplated that top surfaces (or other surfaces) can be textured for additional aesthetic or other benefits. FIGS. 11-12 show a pair of adjacent blocks 138, 140 that are configured similarly to block 20, but with a textured top surface 142 in place of the substantially smooth top surface 72. In FIG. 11, the blocks 138, 140 are orientated in substantially the same direction as in FIG. 8. In FIG. 12, the blocks 138, 140 are orientated in opposite directions as in FIGS. 5-7. Other top surface textures can be optionally provided. In yet further embodiments, the sides and top surfaces can include natural rock features. For the purpose of this application "natural rock features" means false joints, cavities, fissures, planar offsets, shale layers, chips and/or other surface irregularities, edge variations that produce variable width gaps between units, and color variations that singularly or in combination lend a natural rock or stone appearance to the unit.

Figure 13:
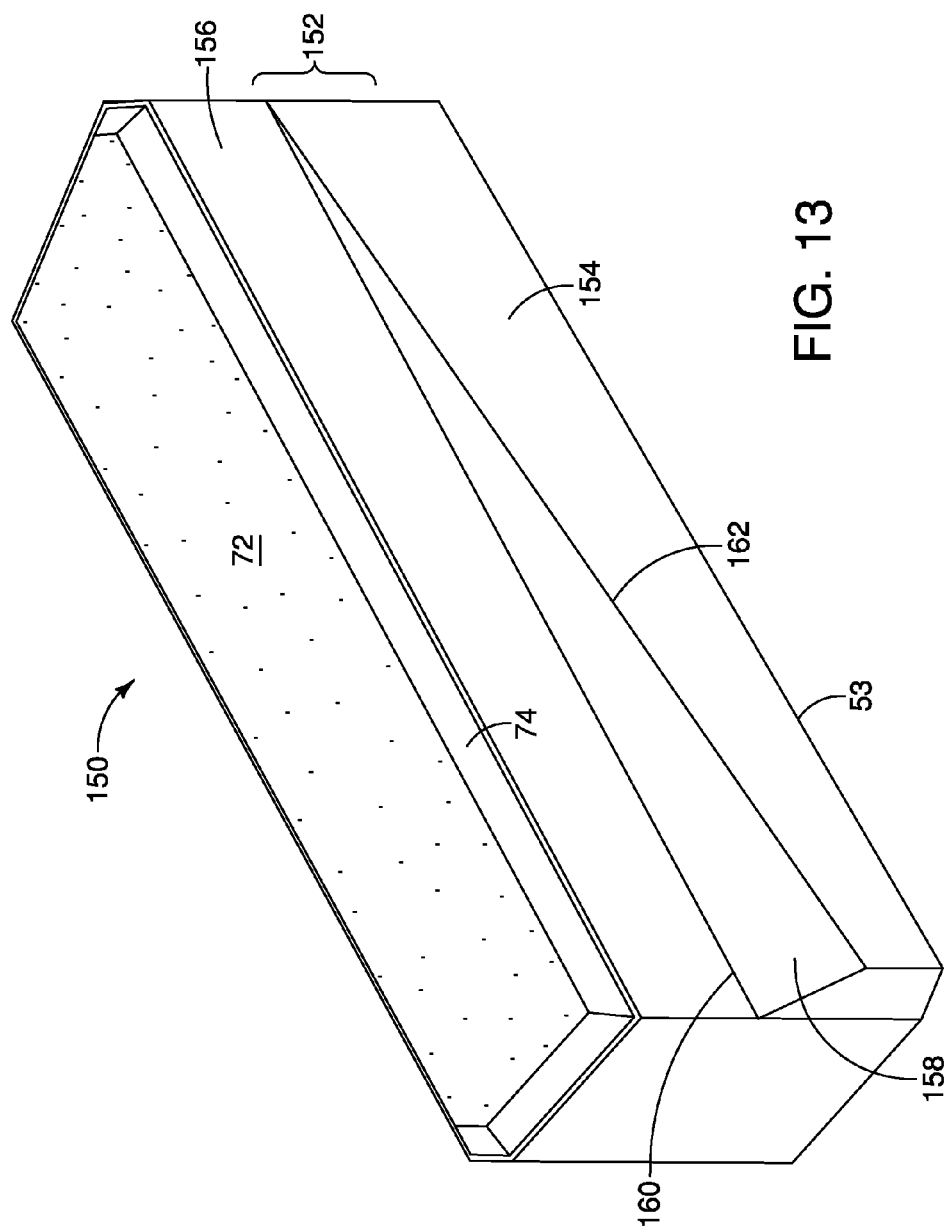
FIG. 13 is a perspective view of a twisted block according to a third embodiment of the invention, in which a transition portion is disposed at a higher location with respect to a bottom surface of the block. The opposing view of the block is similar to FIG. 13.

FIG. 13 shows a twisted block 150 according to another embodiment of the invention. On each side of block 150, the transition portion 152 between lower portion 154 and upper portion 156 is raised with respect to the bottom surface 53, providing a higher extending lower portion, and forming a more robust base. Put another way, if the lower portion 154 and transition portion 152 are considered a foot, the twisted block 150 can be considered to have a raised foot. The bottom of the transition portion 152 can be disposed above the bottom surface 53 by a dimension of at least one-quarter of the block height. The transition portion 152 includes a generally triangular slanted side 158 that extends downwardly and outwardly between an inner edge 160 at the upper portion 156 to an outer edge 162 disposed vertically above the lower portion 154. The raised transition portion 152 provides a base for improved paving connection and transfer of shear and load to adjoining paving or edging blocks. The example block 150 can be otherwise configured similarly to block 20 or other twisted blocks.

Figure 14:
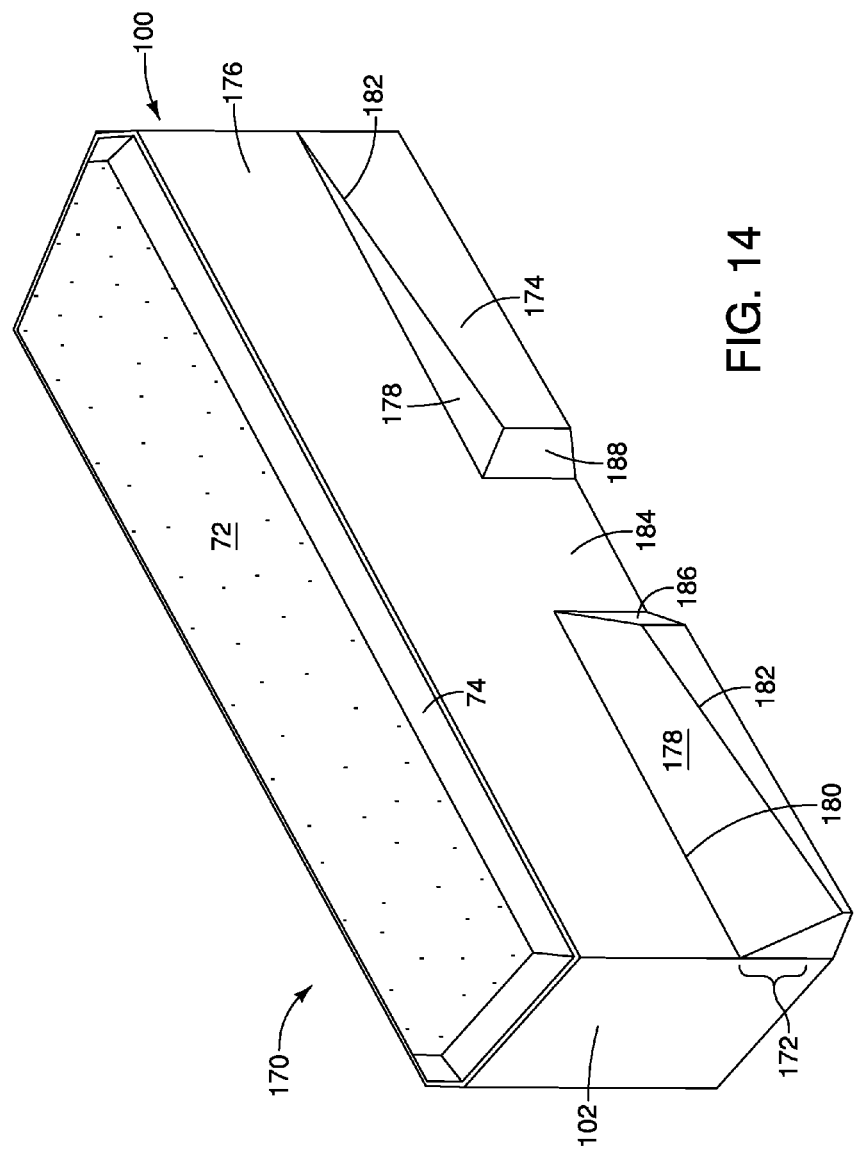
FIG. 14 is a perspective view of a twisted block according to a fourth embodiment of the invention, in which a transition portion and lower portion of the block includes a gap. The opposing view of the block is similar to FIG. 14.

FIG. 14 shows a twisted block 170 according to another embodiment of the invention. Each side of the block 170 includes a transition portion 172 disposed between a lower portion 174 and an upper portion 176. The transition portion 172 includes a slanted side 178 that extends downwardly and outwardly from an inner edge 180 at the upper portion 176 to an outer edge 182 disposed vertically above the lower portion 174. A gap 184, such as a vertical channel or slot, is provided in both the transition portion 172 and the lower portion 174 (i.e., in a foot of the block 170), which gap defines two generally opposed faces 186, 188. It will be appreciated that the shape of the gap 184 and the faces 186, 188 can vary from the example block 170. The gap 184 or other such gaps can provide water drainage for a permeable surface covering. It is also contemplated that a transition portion on one side of the block 170 can include the gap 184, while the other side has a continuous transition portion and lower portion, e.g., similar to transition portion 26 and lower portion 22 for block 20. In another example embodiment, multiple gaps can be provided in the transitions portions and lower portions (i.e., feet) on one or more sides. The example block 170 can be otherwise configured similarly to block 20, block 150, or other twisted blocks.

In further embodiments, multiple gaps can be formed in the base portion so as to define spacers between the gaps, similar to the spacers disclosed for example in U.S. Pat. No. 7,393,155, which is hereby incorporated by reference. The spacers of each unit engage adjacent units and maintain the integrity of the layout pattern.

Figure 15:
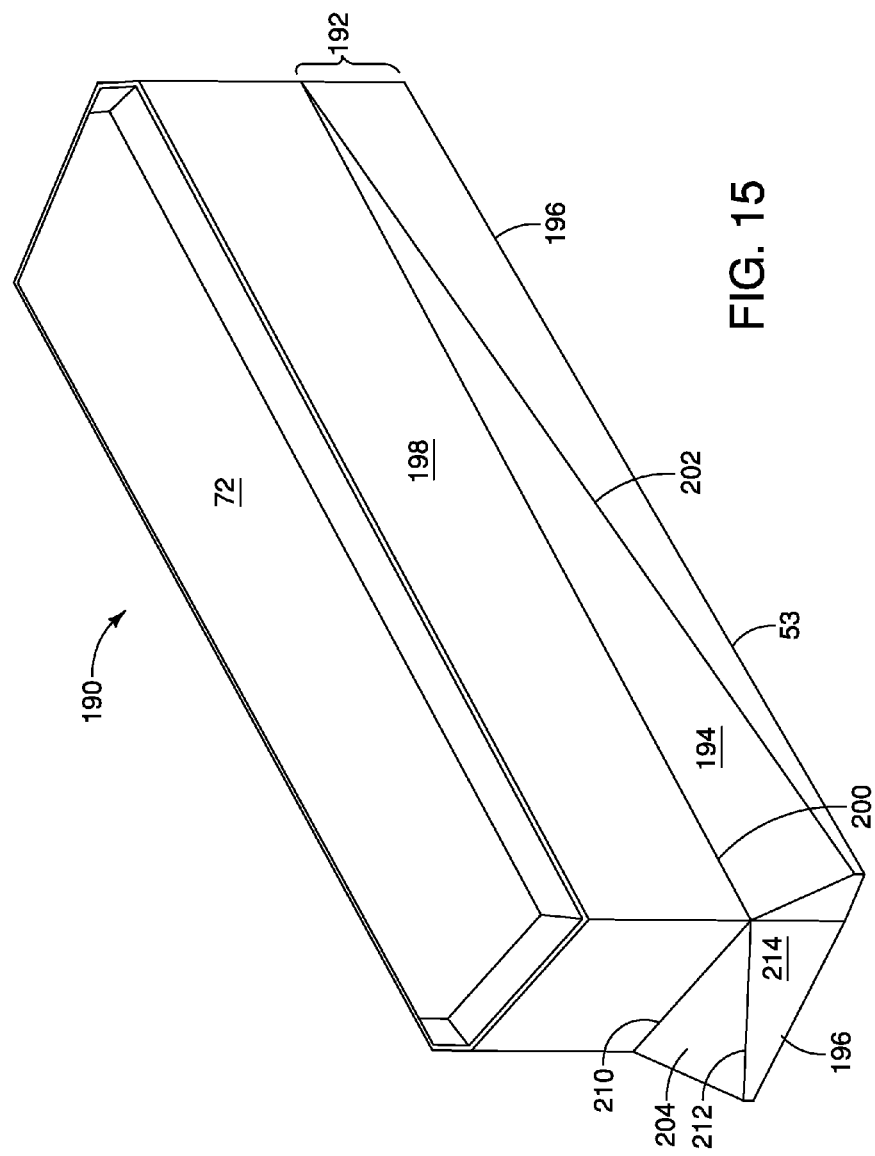
FIG. 15 is a perspective view of a twisted block according to a fifth embodiment of the invention, in which a transition portion includes a slanted side on ends of the block. The opposing view of the block is similar to FIG. 15.

FIG. 15 shows a twisted block 190 according to another embodiment of the invention. Each side of the block 190 includes a transition portion 192 having a slanted side 194 that is disposed between a lower portion 196 and an upper portion 198. The slanted side extends downwardly and outwardly from an inner edge 200 at the bottom of the upper portion 198 to an outer edge 202 disposed vertically above the lower portion 196. Additionally, at each end of the block 190 the transition portion 192 includes a generally triangular slanted side 204 disposed between a lower portion 196 and an upper portion 198. This slanted side 204 extends outwardly and downwardly from an inner edge 210 at the upper portion 198 to an outer edge 212 disposed vertically above the lower portion 196. The inner edge 210 and the outer edge 212 meet at an acute angle. A generally triangular (or generally trapezoidal, depending on the height of the transition portion 192) vertical side 214 is defined between the outer edge 212 and the lower surface 53 of the block 190. The height of the transition portion 192, including slanted sides 194, 204, can be lower, similar to that of block 20, or can be higher, similar to that of block 150. One or more gaps can also be provided in the transition portion 192 and lower portions 196. The block 190 can be otherwise configured similarly to block 20, 150, 170, or other blocks.

Figure 16:
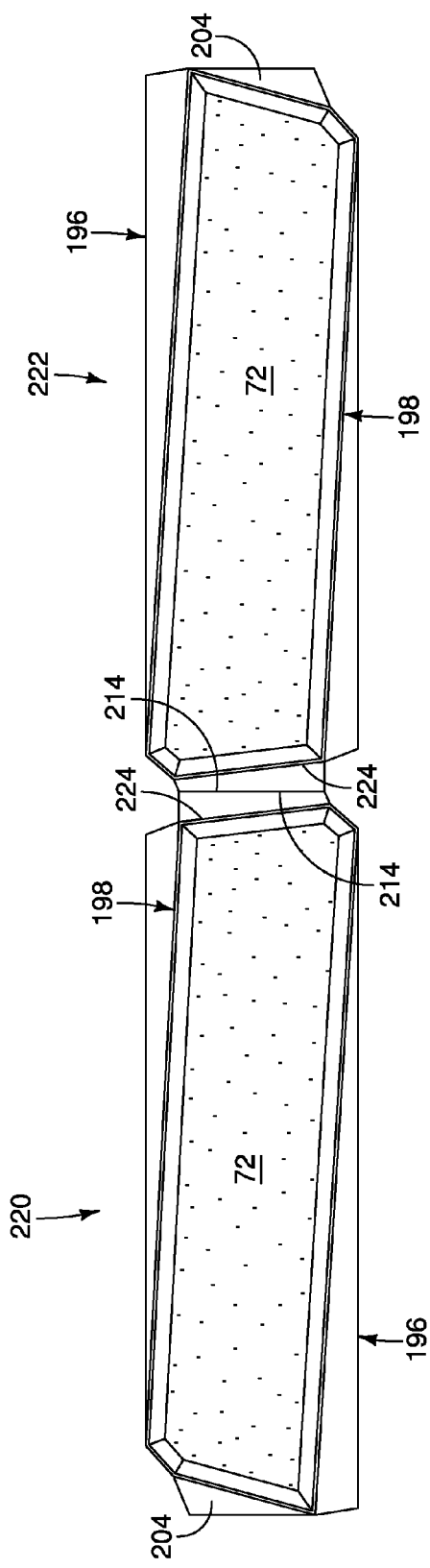
FIG. 16 is a top plan view of a pair of adjacent twisted blocks according to the fifth embodiment, with a second end of one block abutting a second end of a second block.

FIG. 16 shows an example arrangement of two adjacent blocks 220, 222 configured similarly to block 190 and oriented similarly to that shown in FIGS. 5-7. Ends 224 of the blocks 220, 222 (e.g., second ends of each block) engage at facing vertical edges 226. Similar to FIGS. 5-7, the blocks 220, 222 can form a straight line defined by the lower portions 194 while the upper portions 198 form a saw toothed pattern.

Figure 17:
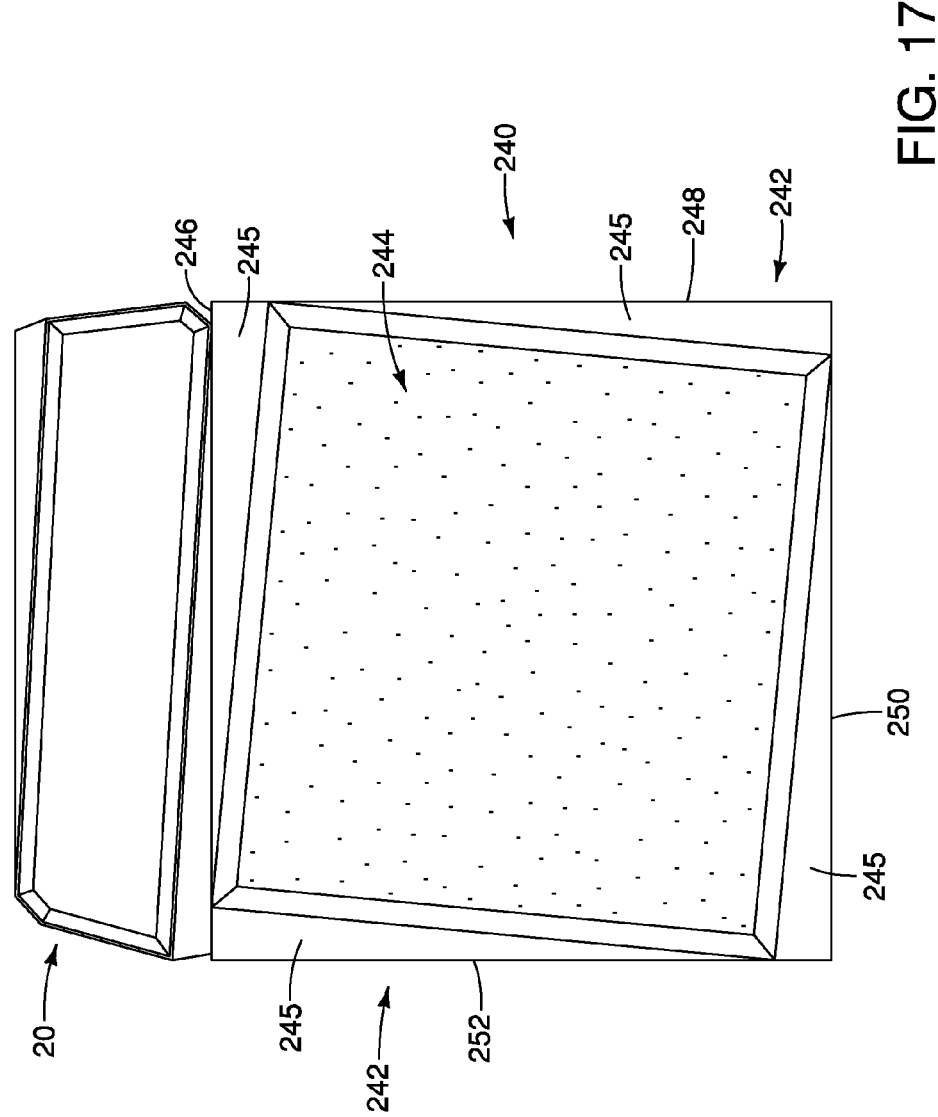
FIG. 17 is a top plan view of a partial surface covering, including a twisted square block according to a sixth embodiment of the invention, edged by a twisted block according to the first embodiment.
Figure 18:
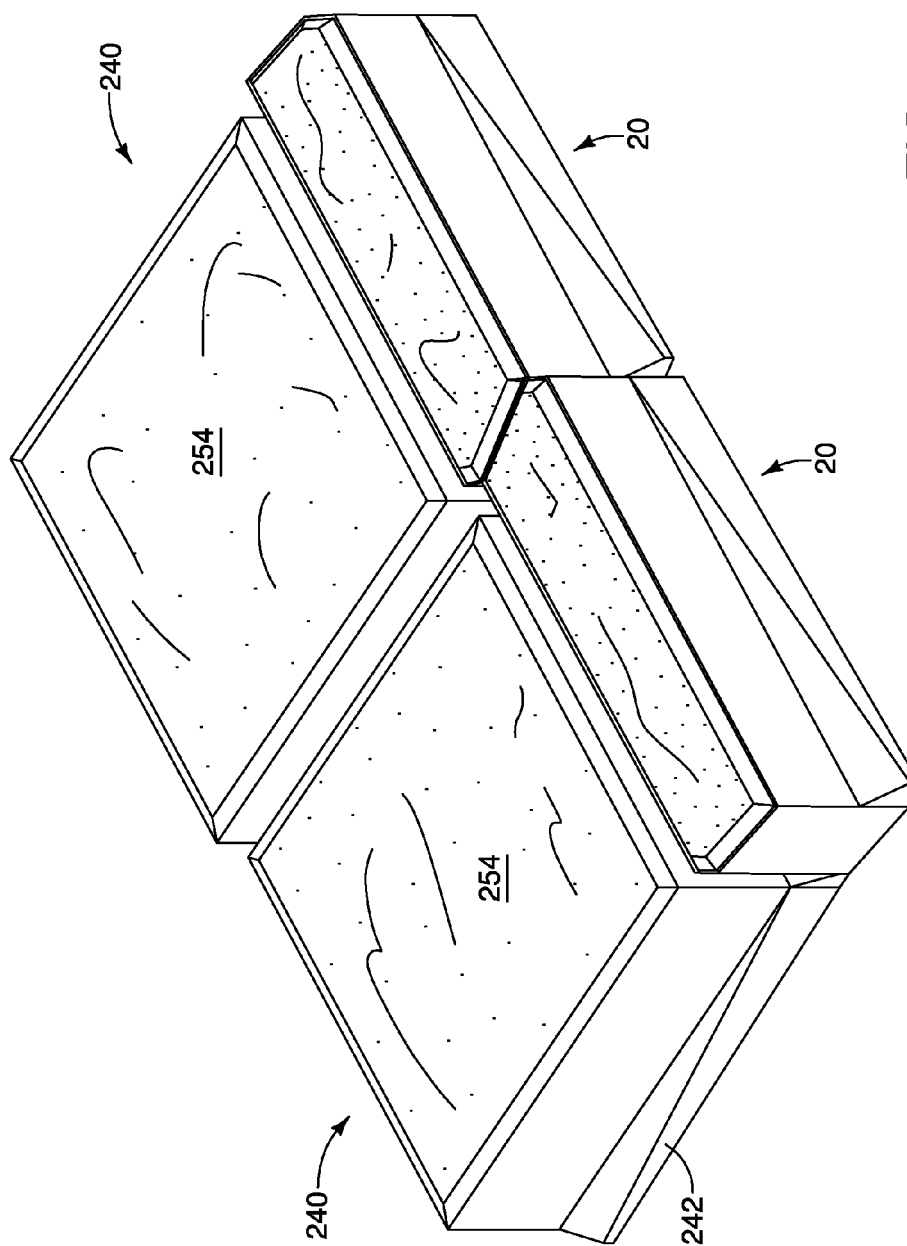
FIG. 18 is a perspective view of a partial surface covering including two square twisted blocks according to the sixth embodiment edged by a pair of twisted blocks according to the first embodiment.
Figure 19:
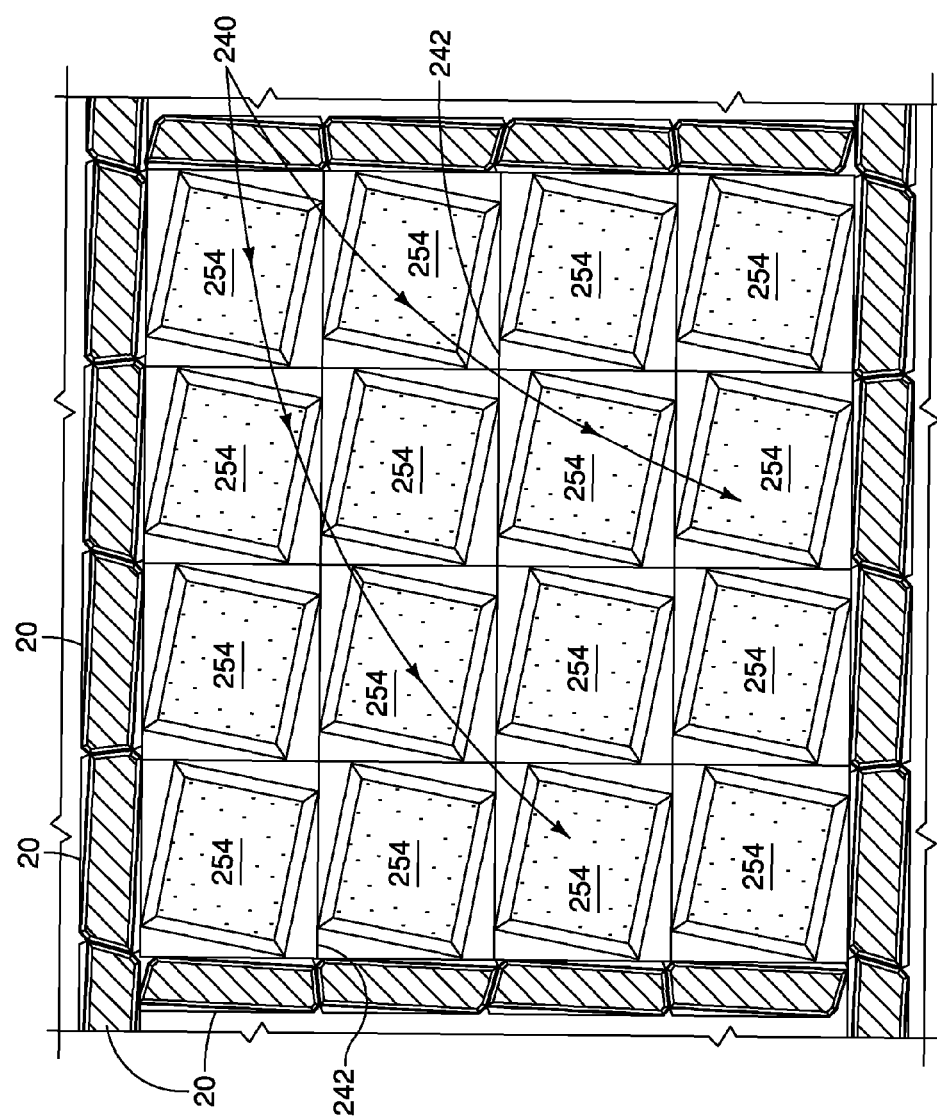
FIG. 19 is a top plan view of a surface covering according to the sixth embodiment of the invention, including a two-dimensional pattern of square twisted blocks according to the sixth embodiment edged by a border of twisted blocks according to the first embodiment.

While groups of particular shapes of the twisted blocks 20, 150, 170, 190, 240 can be used for paving and/or edging, in some example embodiments differently sized and shaped twisted blocks can be combined. FIGS. 17-19 show example arrangements of combined twisted blocks. For example, FIG. 17 shows a partial surface covering including a twisted block 240 according to another embodiment of the invention, in which a lower portion 242 and an upper portion 244 both generally define a square. The width and length of the lower portion 242 are greater than those of the upper portion 244. A transition portion includes slanted sides 245 disposed at each of a first side 246, a second side 248, a third side 250, and a fourth side 252 of the block 240 ("first," "second," "third," and "fourth" are used for purposes of illustration only). The blocks 240 can otherwise be configured similarly to blocks 20, 150, 170, 190, or other blocks. In FIG. 17, the (square) block 240 is adjacent to (trapezoidal) twisted block 20. In the example surface covering, the square block 240 and adjacent square blocks 240 provide a paver, while block 20 provides a border.

FIG. 18 shows a partial surface including two adjacent square blocks 240 edged by two adjacent trapezoidal twisted blocks 20, and FIG. 19 shows a surface covering in which a two-dimensional (e.g., square) pattern of square blocks is edged by a linear border formed by trapezoidal blocks 20. As best viewed in FIG. 19, an interesting aesthetic is provided in which the upper surfaces 254 of the square blocks 240 form a saw toothed pattern, while the outer edge of the arranged square blocks (defined by the lower portions 242 of each block) form a square. Similarly, the upper surfaces of the trapezoidal blocks 20 as arranged in FIG. 19 and the upper surfaces 254 of the square blocks 240 form a saw toothed pattern, while the outer edge of the trapezoidal blocks (defined by the lower portions 22 of each block) form a straight outer edge. Other twisted blocks, such as blocks 150, 170, 190, etc. can be substituted for either the square blocks 240 used for paving or the trapezoidal blocks 20 used for edging. The sides of the square blocks 240 and the trapezoidal blocks 20 can be selected and configured to have the same length as shown in FIG. 19, or can have different lengths to produce different paving or edging patterns.

Figure 20:
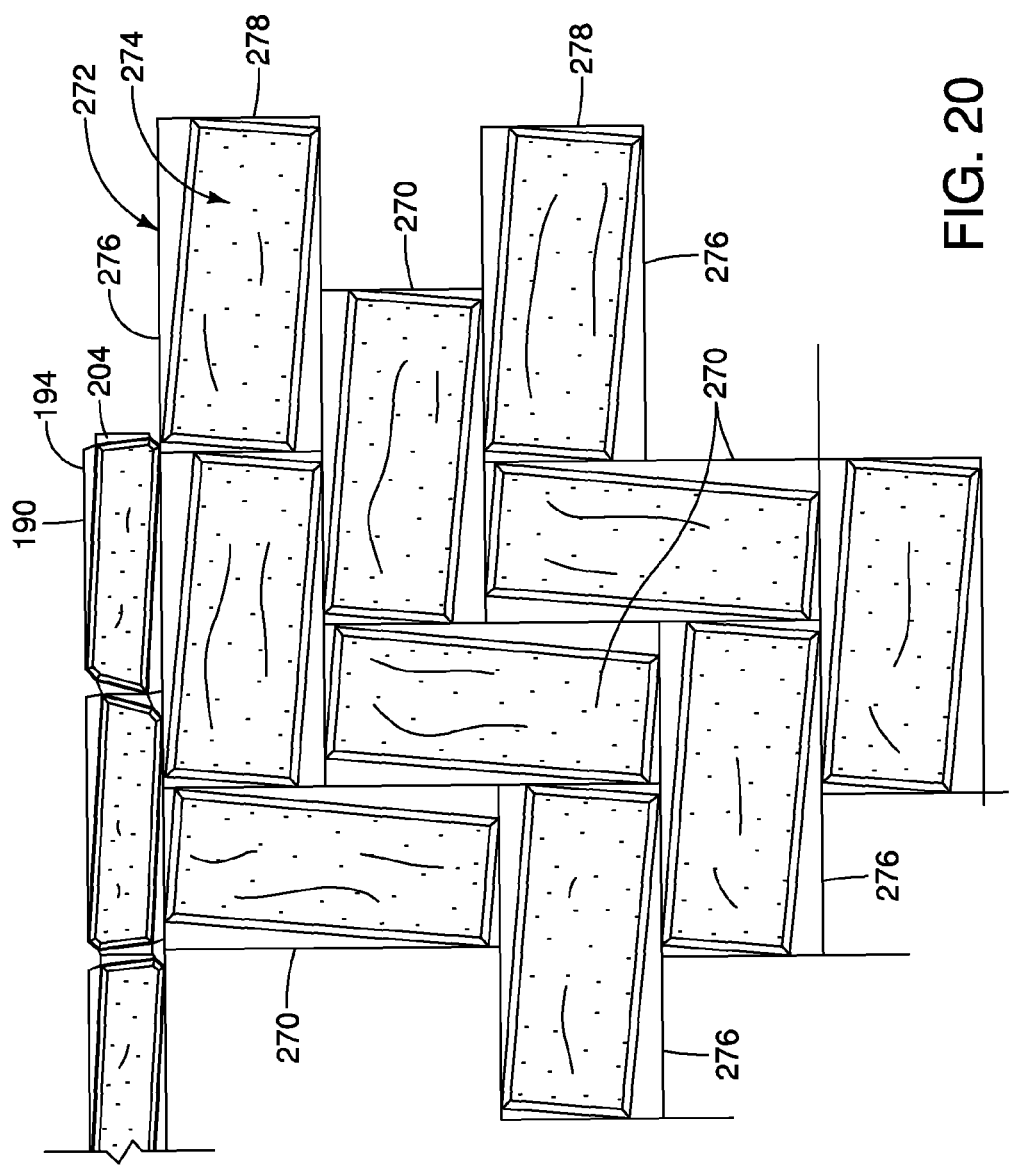
FIG. 20 is a top plan view of a surface covering according to a seventh embodiment of the invention, including a herringbone pattern of rectangular twisted blocks edged by a line of twisted blocks according to the first embodiment.
Figure 21:
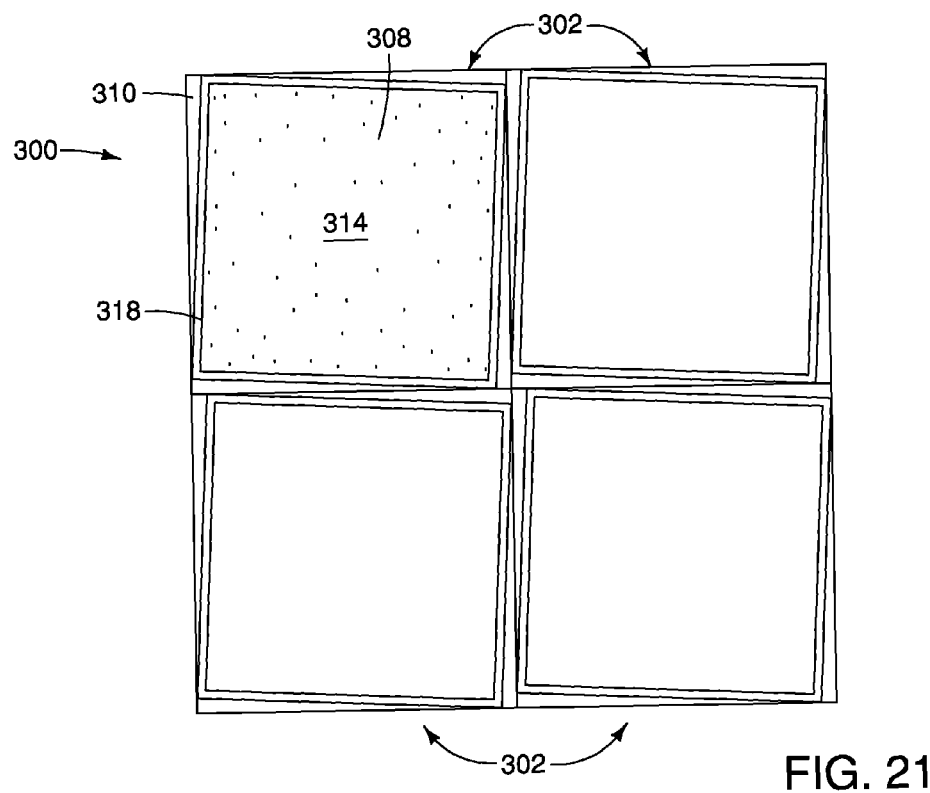
FIG. 21 is a top plan view of a partial surface covering according to an eighth embodiment of the invention, including square twisted blocks having a raised transition portion, and further illustrating a textured top surface on one of the blocks.
Figure 22:
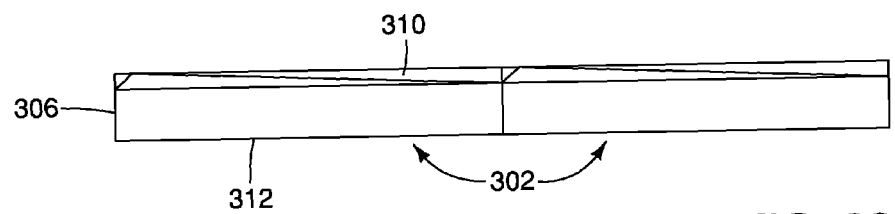
FIG. 22 is a side elevation view of the partial surface covering of FIG. 21.

FIG. 20 shows an example partial surface covering including a pattern of rectangular twisted blocks 270, in which a lower portion 272 and an upper portion 274 each generally define a rectangle. The width of the lower portion 272 is greater than that of the upper portion 274. The upper portion defines a rectangle that is rotated or twisted with respect to the rectangle defined by the lower portion. The example rectangular blocks 270 have transition portions including slanted sides 276, 278 on sides and ends, respectively, configured similarly to the slanted portions 194, 204 in block 190. As shown in FIG. 20, the rectangular twisted blocks 270 are arranged in a herring bone pattern for paving, while the slanted sides 276, 278 align to form substantially straight lines along an edge of these paving blocks. Other example arrangements for paving blocks include, but are not limited to, running bond, half bond, basket weave, and "I" formations.

Aligned trapezoidal twisted blocks 190 are provided to edge the surface covering, though in other embodiments blocks 20, 150, 170, or other twisted blocks (or any combinations thereof) can be used. Also, in this example partial surface covering, the edges of the rectangular twisted blocks 270 and the trapezoidal twisted blocks 190 are not sized to match evenly. However, in other embodiments, edges can be sized to match evenly depending on particular desired surface covering and edging patterns.

Surface coverings in accordance with this disclosure, as shown for example in FIGS. 19 and 20, can be permeable, providing for water drainage. As discussed above with respect to the embodiments of FIG. 14, the transition and lower portions of the surface covering blocks (i.e., the feet of the blocks) can be provided with one or more gaps or channels so that surface covering has increased capacity to drain rain or storm water. Optionally, the gaps as well as spaces between adjacent upper portions of blocks can be filled with pervious material such as sand, gravel, or sod. The pervious material can be loose or bound, e.g., with a polymeric binder. See, e.g., U.S. patent application Ser. No. 14/105,679, filed Dec. 13, 2013, which is incorporated by reference in its entirety.

Figure 23:
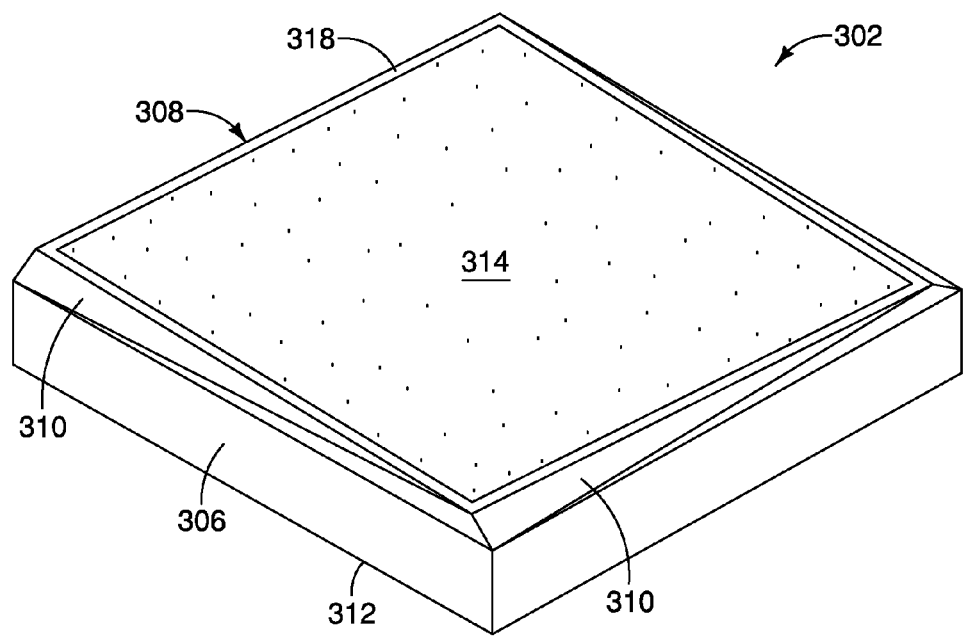
FIG. 23 is a perspective view of a square twisted block according to the eighth embodiment, including a textured top surface.
Figure 24:
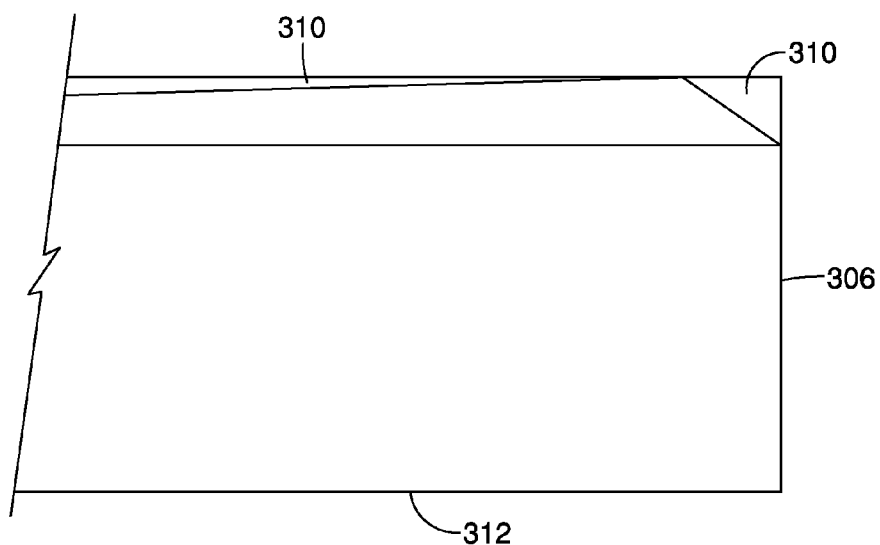
FIG. 24 is a side elevation view of an enlarged portion of a corner of the eighth embodiment block.

FIGS. 21-24 show a surface covering 300 including a plurality of square twisted blocks 302 according to another embodiment of the invention. FIGS. 23-24 show an individual square twisted block 302. The twisted blocks 302 include a transition portion that is disposed between a lower portion 306 (FIGS. 22-24) and an upper portion 308. The transition portion includes slanted sides 310, similar to the slanted sides 245 of square block 240. However, the bottoms of the slanted sides 310 in the square twisted blocks 302 are raised significantly with respect to a bottom surface 312 (or put another way, the lower portions have a significantly greater height). In a non-limiting example block 302, for an overall block height of about 60 mm, the transition portion including slanted sides 310 has a depth of about ⅜" below a top surface 314.

This raised transition portion appears more like a visible chamfer, as opposed to a deep trough (as in square twisted block 240). The overall block 302 appears more like a conventional paver joint. Further, the twisted geometry provided by the lower and upper portions 306, 308 and slanted sides 310 is less likely to be obscured by material such as joint filling sand or polymeric sand. As shown in the top left block 302 in FIG. 21, and as also shown in FIG. 23, the upper portion 308 can include a textured top surface 314 and an optional beveled portion 318 similar to other example blocks disclosed herein.

Further embodiments of the invention can be provided with irregular surface features, which provide aesthetic benefits. The top surface and side surfaces can be molded or sculpted to add fissures, artificial joints, recesses, rounded protrusions, etc. to provide a natural rock-like appearance. In a conventional six-unit mold, the top shoe for each mold cavity can have a different configuration, i.e., introduce a top surface mold variation. Further, the side profile of a substantially vertical lower side face, substantially vertical upper side face with a slanted slide transition there between can be smoothly transitioned (without any sharp lines as shown in the drawings) or can be transitioned in an irregular manner. More specifically, the sides of the unit are preferably drafted, i.e., the sides taper or slant inwardly and progressively from bottom to top (based on the orientation of the unit in the mold). The degree of taper and slant of the side surfaces can vary in an irregular manner, both vertically and horizontally. Fissures, ledges, recesses and other natural rock features can be sculpted in the molds so the sides appear rock-like. See e.g., U.S. Design Pat. No. D674,510 which is hereby incorporated by reference. This side molding feature is referred to herein as an "irregular draft" or as being "irregularly drafted."

To further enhance the natural appearance of surface coverings and structures made with the units, the sides can be molded to match less than perfectly, i.e., that non-substantial gaps are formed between adjacent units, which gaps can vary in thickness. This is preferably accomplished by introducing minor variations in the sides of the upper portion so that gap between adjoining units varies in thickness without interfering with mating and interlocks of the base portions. "Mate" generally refers to fitting or associating suitably.

While preferred embodiments of twisted blocks have been herein illustrated and described, it is to be appreciated that certain changes, rearrangements and modifications may be made therein without departing from the scope of the invention as defined by the appended claims.

What is claimed is:

1. A block suitable for use in paving, edging or wall applications, the block comprising:
   a lower portion having parallel, substantially vertical side faces that are spaced apart by a first width;
   an upper portion having parallel, substantially vertical side faces that are spaced apart by a second width, the second width being smaller than the first width of the lower portion, the side faces of the upper portion being twisted in plan view relative to the side faces of the lower portion; and
   a transition portion extending from the upper and lower portions having at least one slanted side extending between one or more sides of the lower portion and one or more sides, respectively, of the upper portion.

2. A block according to claim 1, wherein the lower portion generally defines a first quadrilateral in plan view, and wherein the upper portion generally defines a second quadrilateral in plan view, wherein the second quadrilateral is twisted in plan view with respect to the first quadrilateral.

3. A block according to claim 2, wherein the second quadrilateral is twisted with respect to the first quadrilateral by a nonzero angle θ about an axis that is parallel to the side faces of the lower portion and the side faces of the upper portion, wherein the angle θ is greater than zero degrees and fewer than ninety degrees.

4. A block according to claim 3, wherein the angle θ is between 1 degree and 10 degrees.

5. A block according to claim 1, wherein the lower portion generally defines a first trapezoid in plan view, and wherein the upper portion generally defines a second trapezoid in plan view, wherein the second trapezoid is twisted in plan view with respect to the first trapezoid.

6. A block according to claim 5, wherein the second trapezoid is twisted with respect to the first trapezoid by a nonzero degree θ about an axis that is parallel to the side faces of the lower portion and the side faces of the upper portion, wherein the angle θ is greater than zero degrees and fewer than ninety degrees.

7. A block according to claim 6, wherein the angle θ is between 1 degree and 10 degrees.

8. A block according to claim 1, wherein the lower portion includes first and second end faces extending between the lower portion side faces, and the upper portion includes first and second end faces extending between the upper portion side faces, the first end face of the upper portion lying in the same vertical plane as the first end face of the lower portion, and the second end face of the upper portion lying in the same vertical plane as the second end face of the lower portion.

9. A block according to claim 8, wherein the side faces of the upper portion comprise a first upper side face and a second upper side face, and wherein the side faces of the lower portion comprise a first lower side face and a second lower side face;
   further comprising:
   a first vertically oriented beveled edge disposed on the lower portion at an intersection of the first lower side face and the lower portion first end face and on the upper portion at an intersection of the first upper side face and the upper portion first end face; and
   a second vertically oriented beveled edge disposed on the lower portion at an intersection of the second lower side face and the lower portion second end face and on the upper portion at an intersection of the second upper side face and the upper portion second end face of the block.

10. The block of claim 1, wherein the transition portion comprises two said slanted sides on respective sides of the block, each slanted side being generally triangular in shape and having an outer edge meeting a respective one of the lower portion side faces and an inner edge meeting a respective one of the upper portion side faces, the inner and outer edges intersecting at an acute angle.

11. The block of claim 1, wherein the upper portion includes a top surface and a beveled edge disposed between the upper portion side faces and the top surface.

12. The block of claim 11, wherein the top surface is flat and substantially smooth.

13. The block of claim 11, wherein the top surface is textured.

14. The block of claim 1,
   wherein the lower portion generally defines a first trapezoid in plan view, and wherein the upper portion generally defines a second trapezoid in plan view, wherein the second trapezoid includes two sides each of which being disposed at an angle greater than zero degrees and fewer than ninety degrees in plan view with respect to the first trapezoid; and
   wherein the upper portion of the block includes a top surface that is trapezoid shaped having edges parallel to and inwardly spaced from the second trapezoid.

15. The block of claim 1, wherein the block is formed from a unitary block material taken from the group consisting of concrete, stone, plastic, and metal.

16. A block according to claim 1, wherein the side faces of the upper portion are twisted relative to the side faces of the lower portion by a nonzero angle θ about an axis that is parallel to the side faces of the lower portion and the side faces of the upper portion, such that the side faces of the upper portion are not parallel to the side faces of the lower portion in plan view, wherein the nonzero angle θ is greater than zero degrees and fewer than ninety degrees.

17. A block according to claim 16, wherein the angle θ is between 1 degree and 10 degrees.

18. A system for edging comprising:
a plurality of blocks according to claim 1 including at least first and second adjacent blocks;
wherein the first and second blocks are abutted end to end along a straight line;
wherein the upper portions of the blocks are uniformly slanted in plan view relative to the line and are offset relative to each other.

19. A system for edging comprising:
a plurality of blocks according to claim 1 including at least first and second adjacent blocks;
wherein the first and second blocks are abutted end to end;
wherein the first and second blocks are disposed at an oblique angle to one another.

20. A surface covering comprising:
a plurality of blocks according to claim 1 including at least two adjacent bonded rows, each row including at least first and second adjacent blocks;
wherein within each row the first and second blocks are abutted end to end in a line;
wherein within each row the first and second blocks are uniformly slanted relative to the line in plan view and are offset relative to one another;
wherein the slants of the first and second blocks in one of the two rows are substantially parallel in plan view to slants of the first and second blocks in the other row.

21. A surface covering comprising:
a plurality of blocks according to claim 1 including at least two adjacent bonded rows, each row including at least first and second adjacent blocks;
wherein within each row the first and second blocks are abutted end to end in a line;
wherein within each row the first and second blocks are uniformly slanted relative to the line in plan view and are offset relative to one another;
wherein the first and second blocks in one of the two rows are reversed in orientation with respect to the first and second blocks in the other row.

22. A surface covering comprising:
a plurality of blocks according to claim 1 including at least first and second adjacent blocks;
wherein the first and second blocks are configured and arranged such that non-substantial gaps are formed between the first and second adjacent blocks.

* * * * *